United States Patent
Colamussi et al.

(10) Patent No.: US 6,554,124 B2
(45) Date of Patent: Apr. 29, 2003

(54) EQUIPMENT FOR FEEDING PRODUCT GROUPS TO A CONVEYOR FOR THEIR PACKAGING

(75) Inventors: Arturo Colamussi, Ferrara (IT); Daniele Davi', Ferrara (IT)

(73) Assignee: Vortex Systems S.r.l., Ferrara (IT)

( * ) Notice: Subject to any disclaimer, the term of this patent is extended or adjusted under 35 U.S.C. 154(b) by 0 days.

(21) Appl. No.: 09/897,685

(22) Filed: Jul. 2, 2001

(65) Prior Publication Data

US 2002/0003079 A1 Jan. 10, 2002

(30) Foreign Application Priority Data

Jul. 5, 2000 (IT) ....................... MI2000A1517

(51) Int. Cl.[7] .............................................. B65G 47/30
(52) U.S. Cl. ................... 198/418.6; 198/588; 198/431; 198/460.2
(58) Field of Search ................ 198/588, 594, 198/418.6, 431, 460.2, 470.1, 477.1; 53/538, 537, 244

(56) References Cited

U.S. PATENT DOCUMENTS

| 3,710,543 | A | * | 1/1973 | Toss ........................... 53/244 |
| 3,860,104 | A | * | 1/1975 | Strauss ....................... 134/127 |
| 3,904,023 | A | * | 9/1975 | Paddock et al. ......... 198/418.6 |
| 4,191,003 | A | | 3/1980 | Talarico |
| 4,316,354 | A | | 2/1982 | Loewenthal |
| 4,611,458 | A | * | 9/1986 | Prakken ....................... 53/247 |
| 4,635,786 | A | * | 1/1987 | Renda ....................... 198/418.6 |
| 5,303,531 | A | | 4/1994 | Senaratne |
| 5,476,361 | A | * | 12/1995 | Uno ............................. 198/431 |
| 5,579,894 | A | * | 12/1996 | Glazier et al. ............... 198/431 |
| 5,704,195 | A | * | 1/1998 | Benz ............................. 53/148 |
| 5,778,640 | A | * | 7/1998 | Prakken et al. ................ 53/244 |
| 6,003,286 | A | * | 12/1999 | Goodman ..................... 53/244 |
| 6,209,710 | B1 | * | 4/2001 | Mueller et al. ........... 198/470.1 |
| 6,234,300 | B1 | * | 5/2001 | De Vos et al. ........... 198/370.03 |
| 6,234,891 | B1 | * | 5/2001 | Klaassen et al. ......... 198/418.6 |

FOREIGN PATENT DOCUMENTS

WO            99 00306        1/1999

* cited by examiner

Primary Examiner—Christopher P. Ellis
Assistant Examiner—Richard Ridley
(74) Attorney, Agent, or Firm—Hedman & Costigan, P.C.

(57) ABSTRACT

Equipment for feeding product groups to a conveyor for their packaging, wherein the groups of products (13), are divided and spaced, for transfer onto the conveyor (12). The equipment includes a transport unit (15) that is moveable in the direction of the conveyor (12) and may be lowered and lifted towards the conveyor. The transport unit (15) receives the divided and spaced product groups (13) and releases the divided and spaced product groups on belts (45) that continuously advance in the direction of a pusher tug conveyor (40, 41). The pusher tug conveyor is associated with and is a part of said conveyor (12). Motors (43, 25) for the pusher tug conveyor (40, 41), for the belts (45) and for the transport unit (15) are controllable in phase, by means of a common processor (49).

6 Claims, 4 Drawing Sheets

EQUIPMENT FOR FEEDING PRODUCT GROUPS TO A CONVEYOR FOR THEIR PACKAGING

The present invention relates to a feeding system for product groups to a conveyor for their packaging.

At present, the packaging of products is performed by the process of feeding the single products on a pusher tug conveyor and packaging said products into a plastic film or the like, which is sealed so as to realise the final package.

It is thus possible to have a relatively quick product feeding and afterwards, a packaging of the single products fed in a succession into a tubular of the film that forms and holds such products. Then, directly in line, the product and/or products are longitudinally transversally sealed at both ends into the tubular-shaped film.

If groups of products must be packaged, they must be formed into groups and loaded on the pusher tug conveyor.

In the first place, this determines a slowing of the packaging operations.

In the second place, as it is evident, with this procedure it is not possible to package more superimposed products, or in any case it is particularly difficult to package products arranged in groups.

In fact, at present it is necessary to interface equipment, machines or devices that have different motion laws; for example, an intermittent or irregular motion machine with one or more continuous motion machines, and vice versa.

The following example is illustrated to better understand the technical problems relating to this field, for the purpose of concretely describing the general problem.

Let us suppose to have to package food products shaped as bars, such as snacks or the like, in groups of product on two layers with the addition, or not, of a stiff support, inserting them into a flowpack.

This type of package is increasingly spreading due to the considerable saving obtainable with respect to the package consisting of a commonly used cardboard box. In order to do so, the products coming from the production process or from a machine that provides to a primary packaging, must be collected, sorted and divided into groups.

Once the groups have been formed, they stay for short time needed by a robot arm or the like to take them and lay them down into a box in one more layers.

As a consequence, the machine works discontinuously, and some of its component parts are not used at their allowed speed since they have to slow at the speed of the slowest part. If the same machine or its main part is to be used to wrap the products into the film, the machine that can be used in cascade is a so-called "flowpack", or enveloping machine, which usually works continuously.

Thus, the problem is that of transferring the groups of products from a first machine (a so-called batching machine) to a second machine (a so-called enveloping machine). In general, such operation consists in laying the groups between the crossflights of a continuously moving chain that transports the same groups into a film tunnel that moves at the same or slightly different speed.

Nowadays, such laying operation is carried out manually, or with delicate "systems" that have strong limitations of capability and flexibility towards package and product.

The main purpose of the present invention is that of solving such problem by realising an equipment which should allow such transfer without determining slowing down or operative problems.

Another purpose is that of realising an equipment for feeding product groups to a conveyor for their packaging in an almost automatic manner, thus avoiding any engagement for the personnel in charge.

Another purpose is that of realising an equipment for feeding product groups that should allow adjusting to the continuous advancement speed of the products.

These and other purposes according to the present invention are achieved by realising an equipment for feeding product groups to a conveyor for their packaging, as disclosed in claim 1.

Further features of the invention are illustrated in the following claims.

Features and advantages of an equipment for feeding product groups according to the present invention will appear more clearly from the following description, made with reference to the attached schematic drawings. In such drawings.

Figure 1:
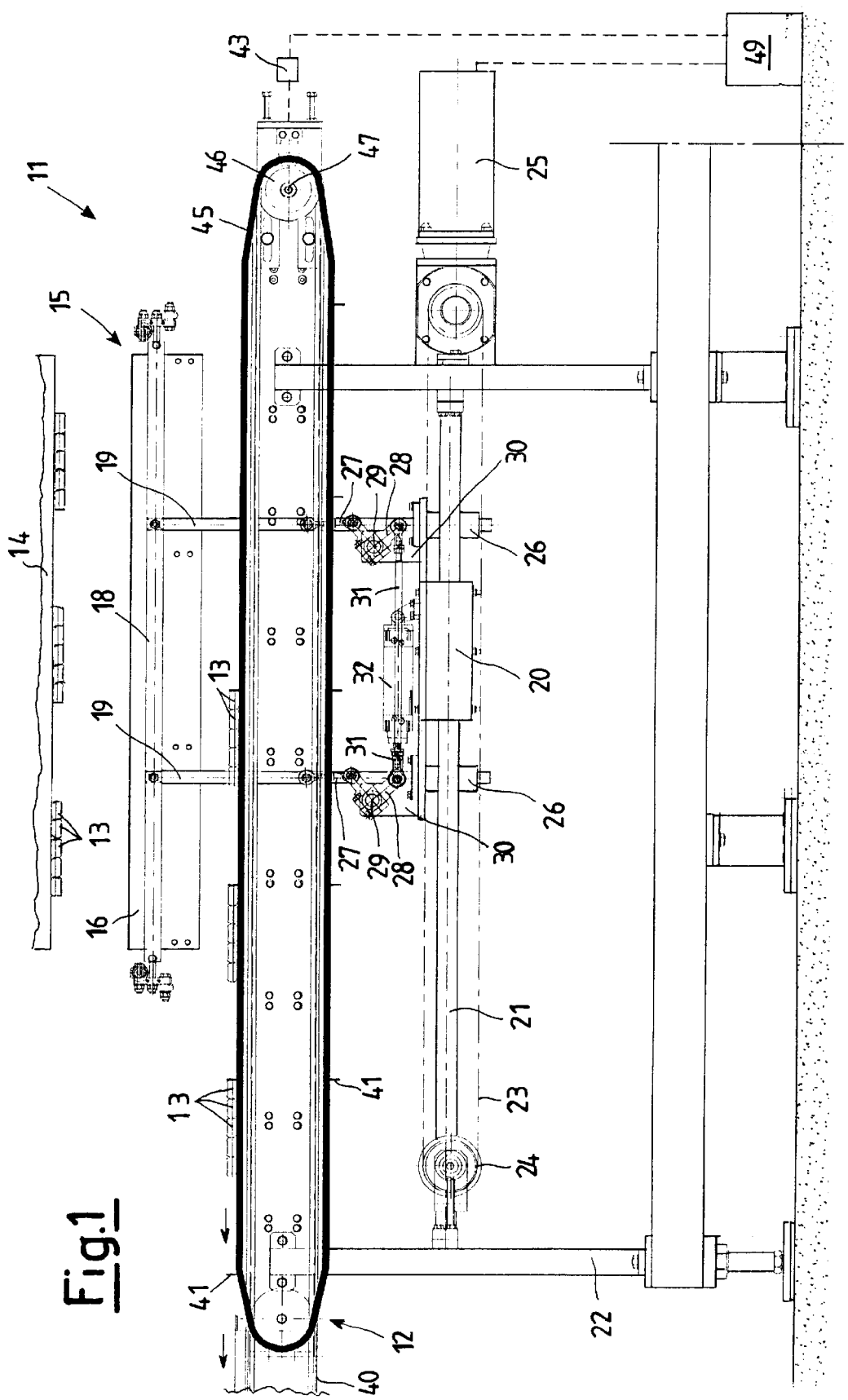
FIG. 1 shows a side elevation view of an equipment of the invention in a first operating step of reception of product groups.

With reference to the figures, there is shown an equipment for feeding product groups according to the present invention, globally indicated with reference numeral 11, to an underlying conveyor 12, to be forwarded to a successive treatment, for example to an in se known packaging device (not shown).

Groups of products 13 are grasped and handled by a gripping arm 14 of a robot or loader (not shown) to be laid on the underlying conveyor 12. According to the present invention, such transfer occurs through the equipment of the present invention.

Such equipment 11 comprises a transport unit 15 which is capable of receiving product groups 13 fed by the gripping arm 14, and it is mobile forward and backward above the underlying conveyor 12.

In particular, the transport unit 15 comprises a pair of longitudinal walls 16, arranged according to the group moving direction, spaced from each other to house products 13 on longitudinal tongues 17 that can rotate transversally with respect to the advancement direction. For this purpose, walls 16 can oscillate with respect to a load-bearing structure 18 consisting of traverses and longitudinal members. Uprights 19 are connected and carried by an underlying truck 20 translatable forward and backward on sliding bars 21 integral with a framework 22 extending from the floor. On framework 22 there is arranged a toothed belt 23 wound on toothed end pulleys 24, one of which is driven by a ratiomotor 25. Belt 23 is alternatively moved forward and backward, and truck 20 is integral with it. Moreover, truck 20 carries uprights 19, sliding into supports 26 integral with truck 20. Each upright 19 is integral with a bar 27, which is part of a toggle 28, centrally pivoted in 29 to a support 30, one of its ends is constrained to the same truck 20.

The other end of toggle 28 is pivoted to an end of a stem 31 of an actuating cylinder 32, which thus controls the movement of uprights 19.

As said before, walls 16 oscillate with respect to the load-bearing structure 18 since an extension 34 of the same walls 16 centrally rotates around a pivot 33. The other end of such extension 34 is connected to a stem 35 of a cylinder 36, or to a further synchronisation bar 37 which is arranged crossed between the two extensions 34 facing one another.

In this way, the two walls 16 are made to oscillate towards each other or departing from each other so as to house or release the product groups 13.

In this way it is possible to understand the operation of the equipment according to the invention.

The underlying conveyor 12 comprises a central chain 40 carrying pusher tugs 41 spaced by a predetermined step, wherein chain 40 is wound as a closed ring around end pulleys 42, only one of which is shown. Chain 40 is controlled by a motor 43. Moreover, framework 22 supports ride tracks 44 on which belts 45 slide and wind ring-wise around end pulleys 46. Thus, belts 45 are arranged lifted in at least one upper branch with respect to the pusher tug 41 conveyor 40.

On a shaft 47 of motor 43 there is connected an encoding device, so-called encoder 48 that correlates the movement of motor 43 to ratiomotor 25 that controls the translation of truck 20 and thus, of the transport unit 15.

An equipment is thus realised according to the present invention, that in a first step allows discontinuously loading a transport unit 15, which can be longitudinally moved with respect to the system, with a certain number of products 13. Afterwards, in a second step, the transport unit 15 follows chain 40 of the underlying conveyor, for example of a so-called "flowpack", enters in phase with it and gently lays the product groups 13 between pusher tug or crossflights 41 of the same chain 40.

Figure 2:
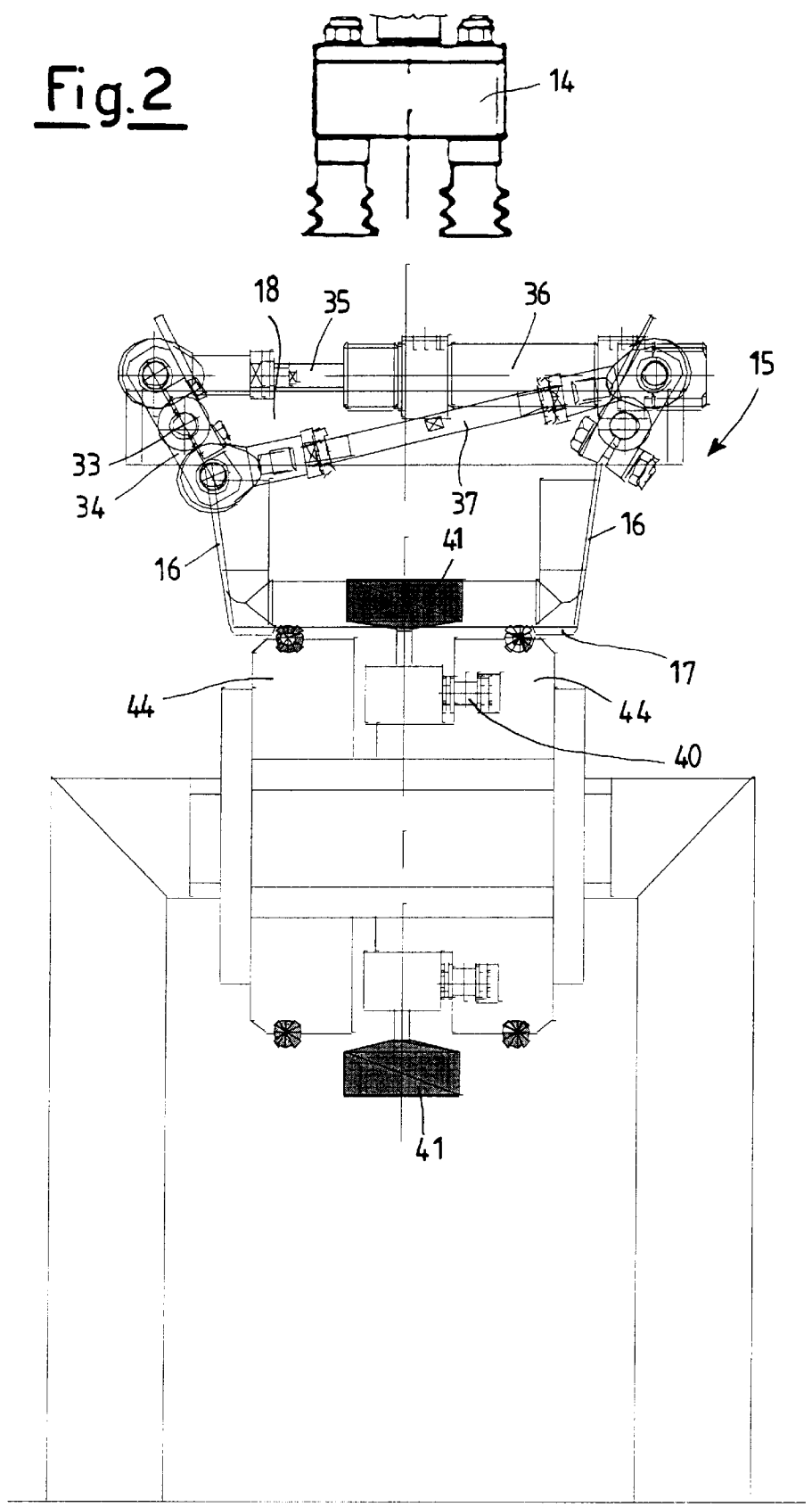
FIG. 2 shows an enlarged section of a portion of the equipment shown in FIG. 1 in a first operating step.
Figure 3:
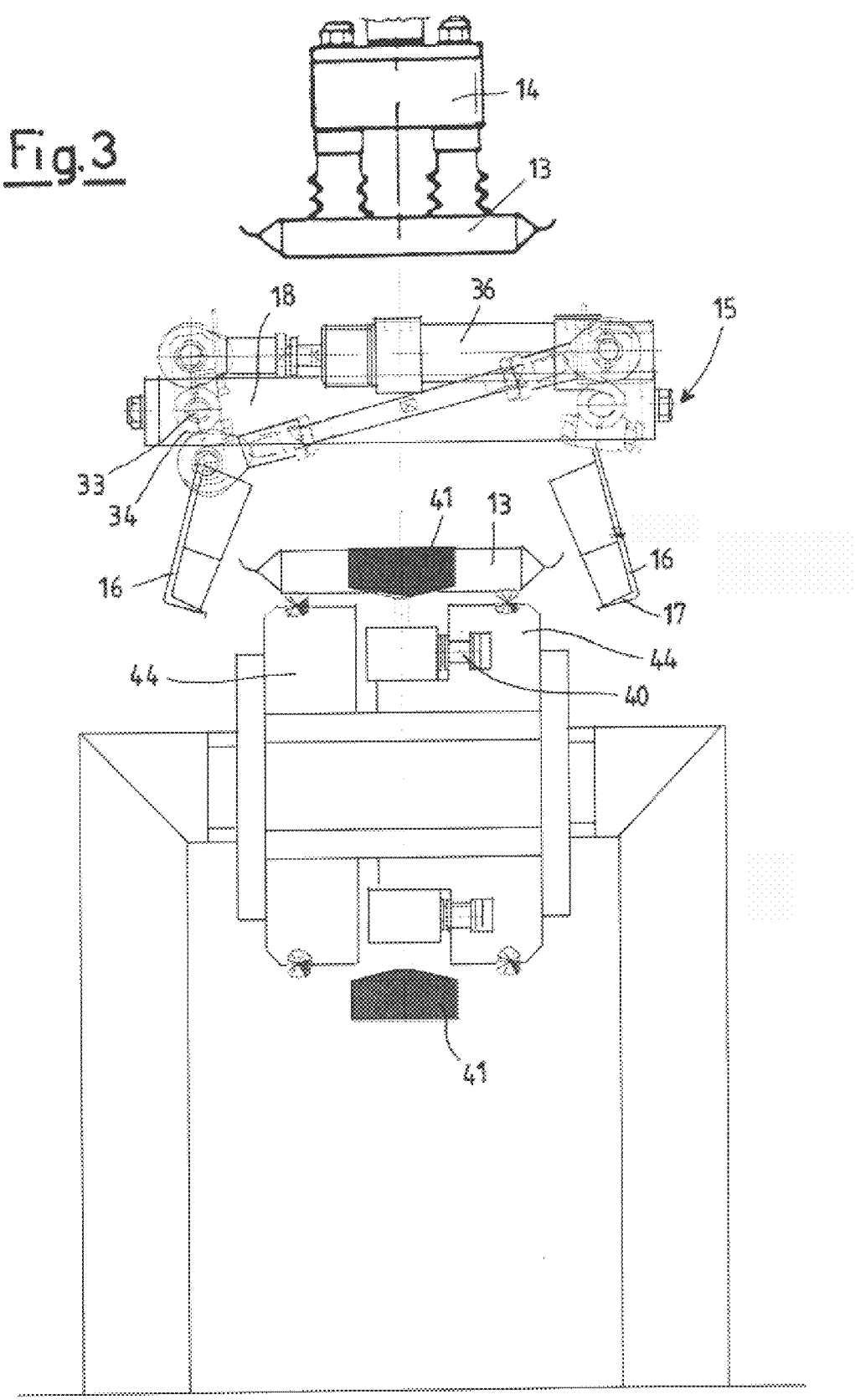
FIG. 3 shows a view similar to FIG. 1 in a second operating step.
Figure 4:
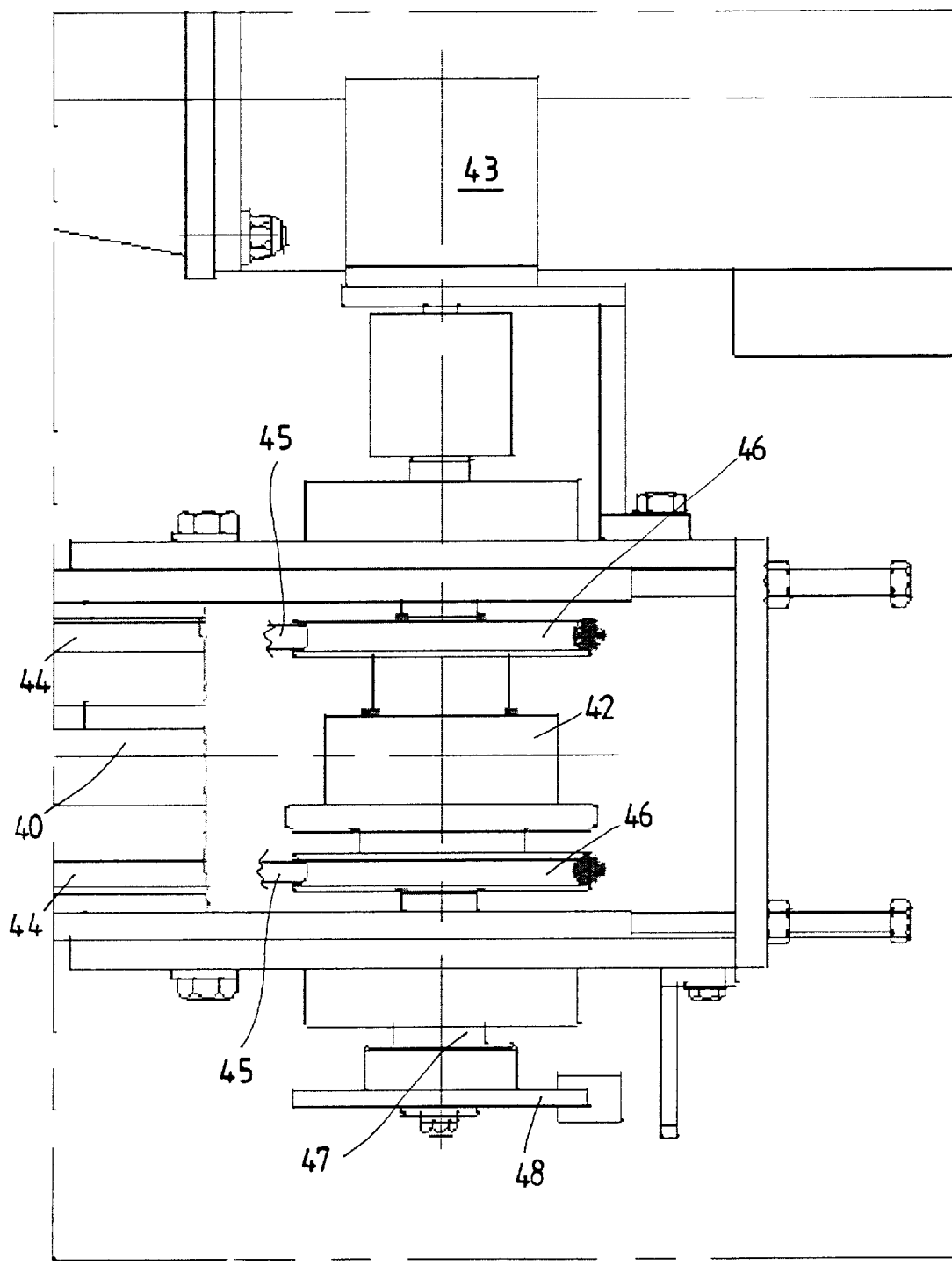
FIG. 4 shows an enlarged top plan view of an end of the equipment associated to a pusher tug equipment.

FIGS. 2 and 3 show the operation of walls 16 and of the respective tongues 17 for supporting and releasing the product groups. Such release occurs once the transport unit 15 has lowered on belts 45 and has entered into phase with them. Then, belts 45 descend from ride tracks 44 and release the product groups on chain 40, which promotes their advancement thanks to the presence of pusher tugs 41.

In fact, it must be noted that two small belts 45 are mounted next to chain 40, and its upper surface is higher than the upper side of chain 40. Thus, the product groups 13 are laid on such belts 45 between the pusher tugs 41 of chain 40. Belts 45 have the same speed of chain 40 and they have the purpose of transporting the products with the pusher tugs 41 of the chain not pushing against the same products.

The operation can be briefly described.

The transport unit 15 is stationary in a predetermined position such as that shown in FIG. 1. The gripping arm 14 provides to releasing and laying the product groups 13 into the transport unit 15 between walls 16 on tongues 17 (FIG. 2).

At this point, the transport unit 15 starts its motion to enter into phase with chain 40 through the actuation of motor 25 of truck 20. This can occur since the position of chain 40 is transmitted by encoder 48 to a controller of motor 43, which in turn is correlated through a processor 49 to motor 25 of truck 20.

Once it is perfectly in phase, the transport unit 15 lowers thanks to the actuation of cylinder 32, thus laying the product groups 13 between the pusher tugs 41 of chain 40 (FIG. 1) on belts 45.

Afterwards, walls 16 are opened wide (FIG. 3) and the transport unit 15 is lifted without affecting the product groups 13 just laid on belts 45.

Simultaneously to the above movements, the transport unit 15 starts a backward movement towards the loading position seen above. Moreover, walls 16 are closed through a new actuation of cylinders 36 and the transport unit 15 is lifted so as to obtain the loading configuration again.

Of course, the above cycle time must be equal to or less than, the time in which the chain covers a path equal to the length of the number of groups to be laid, three in the example.

This is obtained by regulating the speed of the flowpack, and thus of chain 40, based on the number of products 13 that enter into the upstream batching machine, not shown.

It is evident that the equipment according to the invention allows loading products having different length, by simply regulating the position of walls 16, or different thickness or number of layers by changing the vertical stroke of the transport unit 15.

An equipment for feeding product groups to a conveyor for their packaging thus conceived can be subject to several variants and modifications, all falling within the scope of the present invention. Moreover, all details can be replaced with other technically equivalent details. In practice, the materials used as well as the sizes, can be of any type according to the technical requirements.

What is claimed is:

1. Equipment for feeding product groups to a conveyor for packaging, wherein said product groups are products (13), which were previously divided and spaced, for transfer onto and phased with, said conveyor (12) which comprises a transport unit (15) that is moveable in the direction of said conveyor (12) and can be lowered and lifted towards said conveyor, said transport unit (15) receiving said divided and spaced product groups (13) and releasing said divided and spaced product groups onto belts (45) that continuously advance in the direction of a pusher tug conveyor (40, 41) associated with said belts (45), said belts (45) being part of said conveyor (12), said belts (45) being arranged according to a closed ring and releasing said product groups (13) on one end of said pusher tug conveyor (40, 41) and having motor (43) and motor (25) for driving said pusher tug conveyor (40, 41), for driving said belts (45) and for driving said transport unit (15), said pusher tug conveyor (40,41), said belts (45) and said transport unit (15) being controllable in phase through a common processor (49), wherein said transport unit (15) is mounted on a translatable load-bearing structure (18), said transport unit comprising a pair of faced walls (16) that oscillate with respect to one another in departure or approach in order to house and hold or release said product groups (13) received from a loader (14).

2. Equipment according to claim 1, wherein said pair of walls (16) is provided with tongues (17) at one end, for supporting said product groups (13).

3. Equipment according to claim 1 or 2, wherein said pair of walls (16) is actuated by at least one cylinder (36) arranged on a translatable load-bearing structure (18) through a hinged-arm linkage (33, 34, 37).

4. Equipment according to claim 1, wherein said belts (45) in at least one upper branch are arranged lifted with respect to said pusher tug conveyor (40, 41).

5. Equipment according to claim 1, wherein said transport unit (15) is arranged on a truck (20) translatable forward and backward on sliding bars (21) integral with a framework (22), there being provided at least one actuator (32), for lifting or lowering said transport unit (15).

6. Equipment according to claim 5, wherein said at least one actuator (32) controls said lifting or lowering of said transport unit (15) through a toggle hinged-arm linkage (28, 29, 30).

\* \* \* \* \*